(12) United States Patent
Thimmareddy et al.

(10) Patent No.: US 12,316,660 B2
(45) Date of Patent: May 27, 2025

(54) SYSTEMS, METHODS, AND APPARATUSES FOR TRACKING NETWORK TRAFFIC DATA AND IDENTIFYING ROGUE ACCESS PATTERNS IN AN ELECTRONIC NETWORK

(71) Applicant: BANK OF AMERICA CORPORATION, Charlotte, NC (US)

(72) Inventors: Arjun Thimmareddy, Charlotte, NC (US); Aarron Gull, East Northport, NY (US); Virinchi Ande, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 291 days.

(21) Appl. No.: 17/968,546

(22) Filed: Oct. 18, 2022

(65) Prior Publication Data
US 2024/0129324 A1    Apr. 18, 2024

(51) Int. Cl.
*H04L 9/40*    (2022.01)
(52) U.S. Cl.
CPC ........ *H04L 63/1425* (2013.01); *H04L 63/102* (2013.01); *H04L 63/1416* (2013.01)
(58) Field of Classification Search
CPC  H04L 63/1425; H04L 63/102; H04L 63/1416
USPC ......................................................... 726/23
See application file for complete search history.

(56) References Cited

U.S. PATENT DOCUMENTS

| 8,966,074 | B1 | 2/2015 | Richards | |
|---|---|---|---|---|
| 9,330,134 | B2 * | 5/2016 | Long | G06Q 10/0635 |
| 9,736,050 | B2 * | 8/2017 | Gatta | H04L 43/04 |
| 9,819,807 | B2 | 11/2017 | Richards | |
| 10,020,845 | B2 * | 7/2018 | Gross | H04L 45/24 |
| 10,027,695 | B2 * | 7/2018 | Hohndel | G06F 21/554 |
| 10,063,578 | B2 * | 8/2018 | Flacher | H04L 63/1425 |
| 10,230,612 | B2 * | 3/2019 | Leong | H04L 43/18 |
| 10,291,506 | B2 * | 5/2019 | Mixer | H04L 43/04 |
| 10,382,303 | B2 * | 8/2019 | Khanal | H04L 41/065 |
| 10,484,250 | B2 * | 11/2019 | Kokkula | H04L 43/0876 |
| 10,484,881 | B2 * | 11/2019 | Wang | H04B 17/3913 |

(Continued)

OTHER PUBLICATIONS

Sachin Shetty; Rogue Access Point Detection by Analyzing Network Traffic Characteristics; IEEE:2007; pp. 1-7.*

*Primary Examiner* — Monjur Rahim
(74) *Attorney, Agent, or Firm* — Moore & Van Allen PLLC; Lauren M. Stokes

(57) ABSTRACT

Systems, computer program products, and methods are described herein for tracking network traffic data and identifying rogue access patterns in an electronic network. The present invention is configured to receive a plurality of peer user accounts; receiving a plurality of peer user data associated with the plurality of peer user accounts; generating a relational mapping based at least on the predetermined group; and generating a plurality of peer historical data access patterns based on the plurality of peer user data over the historical predetermined period. The present invention may further be configured to receive a primary user account; receive a plurality of primary user data; generate a plurality of primary user access patterns; compare the plurality of peer historical data access patterns and the plurality of primary user access patterns to generate an abnormality score; and determine whether the abnormality score meets the abnormality threshold.

20 Claims, 8 Drawing Sheets

(56) References Cited

U.S. PATENT DOCUMENTS

| | | | |
|---|---|---|---|
| 10,587,633 B2 * | 3/2020 | Muddu | H04L 63/1441 |
| 10,601,800 B2 * | 3/2020 | Kao | H04L 63/102 |
| 10,693,734 B2 | 6/2020 | Rastogi | |
| 10,742,673 B2 | 8/2020 | Tiagi | |
| 11,277,322 B2 | 3/2022 | Berezecki | |
| 2007/0039049 A1 | 2/2007 | Kupferman | |
| 2018/0367551 A1 * | 12/2018 | Muddu | G06F 16/24578 |
| 2019/0379589 A1 * | 12/2019 | Ryan | G06F 17/142 |
| 2020/0236131 A1 * | 7/2020 | Vejman | H04L 63/1416 |

* cited by examiner

SYSTEMS, METHODS, AND APPARATUSES FOR TRACKING NETWORK TRAFFIC DATA AND IDENTIFYING ROGUE ACCESS PATTERNS IN AN ELECTRONIC NETWORK

FIELD OF THE INVENTION

The present invention embraces a system for tracking network traffic data and identifying rogue access patterns in an electronic network.

BACKGROUND

Organizations and entities using electronic network(s) have a harder time than ever keeping track and determining whether their users are using the electronic network(s) in an acceptable manner. For instance, such organizations and entities may need to track their electronic users' data to determine whether abnormal data accessing has occurred over the electronic network(s).

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for tracking network traffic data and identifying rogue access patterns, the system comprising: a memory device with computer-readable program code stored thereon; at least one processing device operatively coupled to the at least one memory device and the at least one communication device, wherein executing the computer-readable code is configured to cause the at least one processing device to: receive a plurality of peer user accounts, wherein the plurality of peer user accounts is at least a part of a predetermined group; receive a plurality of peer user data associated with the plurality of peer user accounts, wherein the plurality of peer user data comprises data over a historical predetermined period; generate a relational mapping based at least on the predetermined group, wherein the relational mapping comprises the plurality of peer user accounts and the plurality of peer user data; generate a plurality of peer historical data access patterns based on the plurality of peer user data over the historical predetermined period; receive a primary user account associated with the plurality of peer user accounts; receive a plurality of primary user data, wherein the plurality of primary user data comprises data of the primary user account over a current predetermined period; generate a plurality of primary user access patterns based on the plurality of primary user data; compare the plurality of peer historical data access patterns and the plurality of primary user access patterns to generate an abnormality score; determine an abnormality threshold; and determine whether the abnormality score meets the abnormality threshold.

In some embodiments, the plurality of peer historical data access patterns comprises data regarding at least one application accessed by the plurality of peer user accounts and at least one access role for the at least one application.

In some embodiments, the processing device is further configured to: apply an abnormal data access machine learning model to the plurality of peer user accounts; and generate, by the abnormal data access machine learning model, the plurality of peer historical data access patterns. In some embodiments, the processing device is further configured to: apply the abnormal data access machine learning model to the plurality of primary user data; and generate, by the abnormal data access machine learning model, the plurality of primary user access patterns. In some embodiments, the processing device is further configured to: apply the abnormal data access machine learning model to a plurality of historical primary user data, wherein the plurality of historical primary user data comprises data over the historical predetermined time period; and generate, by the abnormal data access machine learning model, a plurality of primary historical data access patterns. In some embodiments, the processing device is further configured to compare the plurality of primary user access patterns and at least one of the plurality of primary historical data access patterns or the plurality of peer historical data access patterns to generate the abnormality score.

In some embodiments, the processing device is further configured to generate, based on the determination the abnormality score meets the abnormality threshold, an abnormal alert interface component, wherein the abnormal alert interface component configures a graphical user interface of a user device.

In some embodiments, the relational mapping comprises a plurality of nodes associated with each user of the predetermined group, and wherein the predetermined group further comprises the primary user account. In some embodiments, the relational mapping comprises at least one edge, wherein the at least one edge is associated with each node of the plurality of nodes.

In some embodiments, the at least primary user access pattern and at least one of a plurality of primary historical data access patterns or the plurality of peer historical data access patterns comprise a frequency distribution.

In some embodiments, the historical predetermined time period and the current predetermined time period comprise a same amount of time.

In some embodiments, the historical predetermined time period is prior to the current predetermined time period.

In another aspect, a computer program product for tracking network traffic data and identifying rogue access patterns is provided. The computer program product may comprise at least one non-transitory computer-readable medium having computer-readable program code portions embodied therein, the computer-readable program code portions which when executed by a processing device are configured to cause the processor to: receive a plurality of peer user accounts, wherein the plurality of peer user accounts is at least a part of a predetermined group; receive a plurality of peer user data associated with the plurality of peer user accounts, wherein the plurality of peer user data comprises data over a historical predetermined period; generate a relational mapping based at least on the predetermined group, wherein the relational mapping comprises the plurality of peer user accounts and the plurality of peer user data; generate a plurality of peer historical data access patterns based on the plurality of peer user data over the historical predetermined period; receive a primary user account associated with the plurality of peer user accounts; receive a plurality of primary user data, wherein the plurality of primary user data comprises data of the primary user account over a current predetermined period; generate a plurality of primary user access patterns based on the plurality of primary user data; compare the plurality of peer historical data access patterns and the plurality of primary user access patterns to generate an abnormality score; determine an abnormality threshold; and determine whether the abnormality score meets the abnormality threshold.

In some embodiments, the plurality of peer historical data access patterns comprises data regarding at least one application accessed by the plurality of peer user accounts and at least one access role for the at least one application.

In some embodiments, the relational mapping comprises a plurality of nodes associated with each user of the predetermined group, and wherein the predetermined group further comprises the primary user account.

In some embodiments, the at least plurality of primary user access patterns and at least one of a plurality of primary historical data access patterns or the plurality of peer historical data access patterns comprise a frequency distribution.

In another aspect, a computer-implemented method for tracking network traffic data and identifying rogue access patterns is provided. The computer-implemented method may comprise: receiving a plurality of peer user accounts, wherein the plurality of peer user accounts is at least a part of a predetermined group; receiving a plurality of peer user data associated with the plurality of peer user accounts, wherein the plurality of peer user data comprises data over a historical predetermined period; generating a relational mapping based at least on the predetermined group, wherein the relational mapping comprises the plurality of peer user accounts and the plurality of peer user data; generating a plurality of peer historical data access patterns based on the plurality of peer user data over the historical predetermined period; receiving a primary user account associated with the plurality of peer user accounts; receiving a plurality of primary user data, wherein the plurality of primary user data comprises data of the primary user account over a current predetermined period; generating a plurality of primary user access patterns based on the plurality of primary user data; comparing the plurality of peer historical data access patterns and the plurality of primary user access patterns to generate an abnormality score; determining an abnormality threshold; and determining whether the abnormality score meets the abnormality threshold.

In some embodiments, the plurality of peer historical data access patterns comprises data regarding at least one application accessed by the plurality of peer user accounts and at least one access role for the at least one application.

In some embodiments, the relational mapping comprises a plurality of nodes associated with each user of the predetermined group, and wherein the predetermined group further comprises the primary user account.

In some embodiments, the at least the plurality of primary user access patterns and at least one of a plurality of primary historical data access patterns or the plurality of peer historical data access patterns comprise a frequency distribution.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
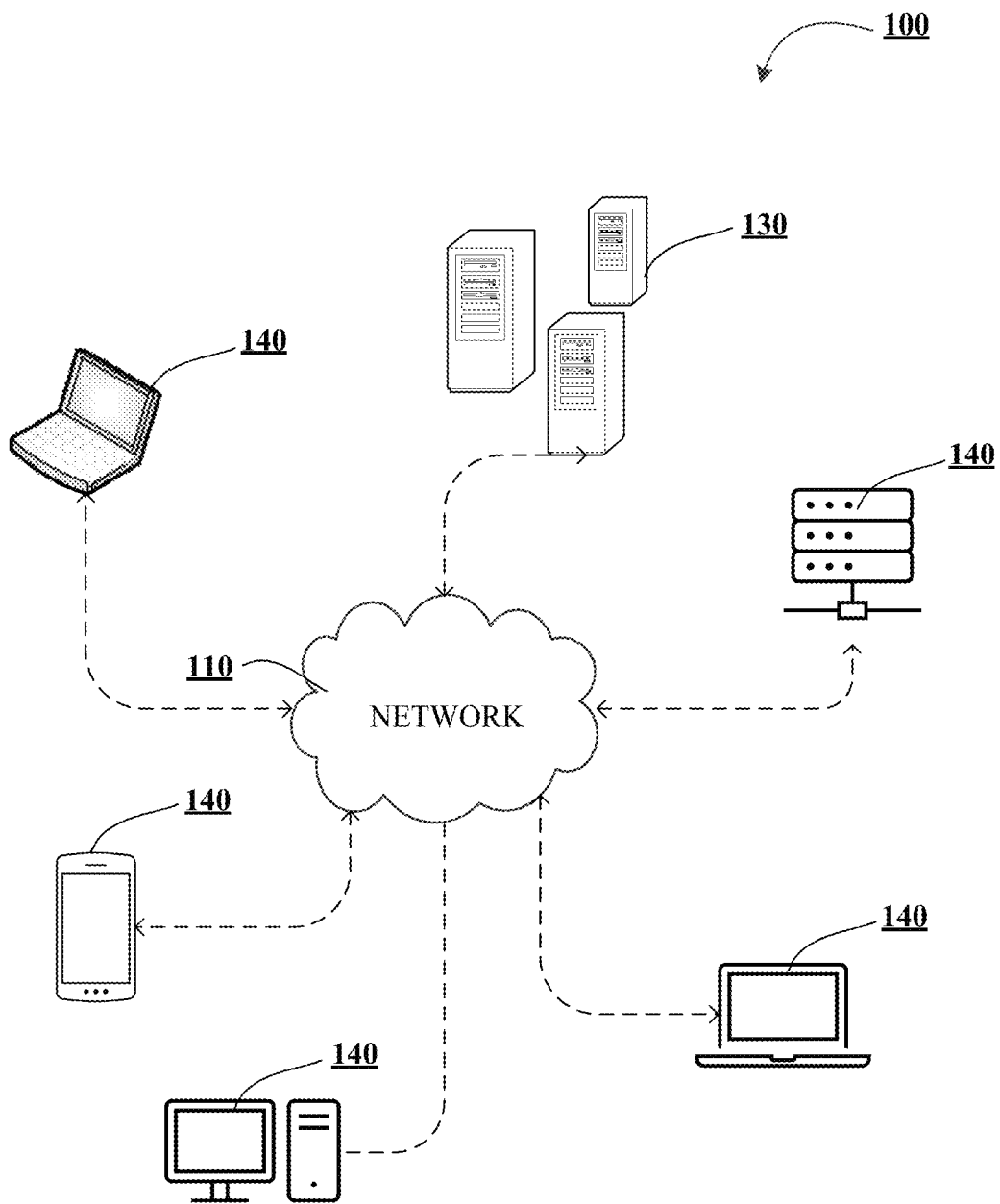
Figure 1B:
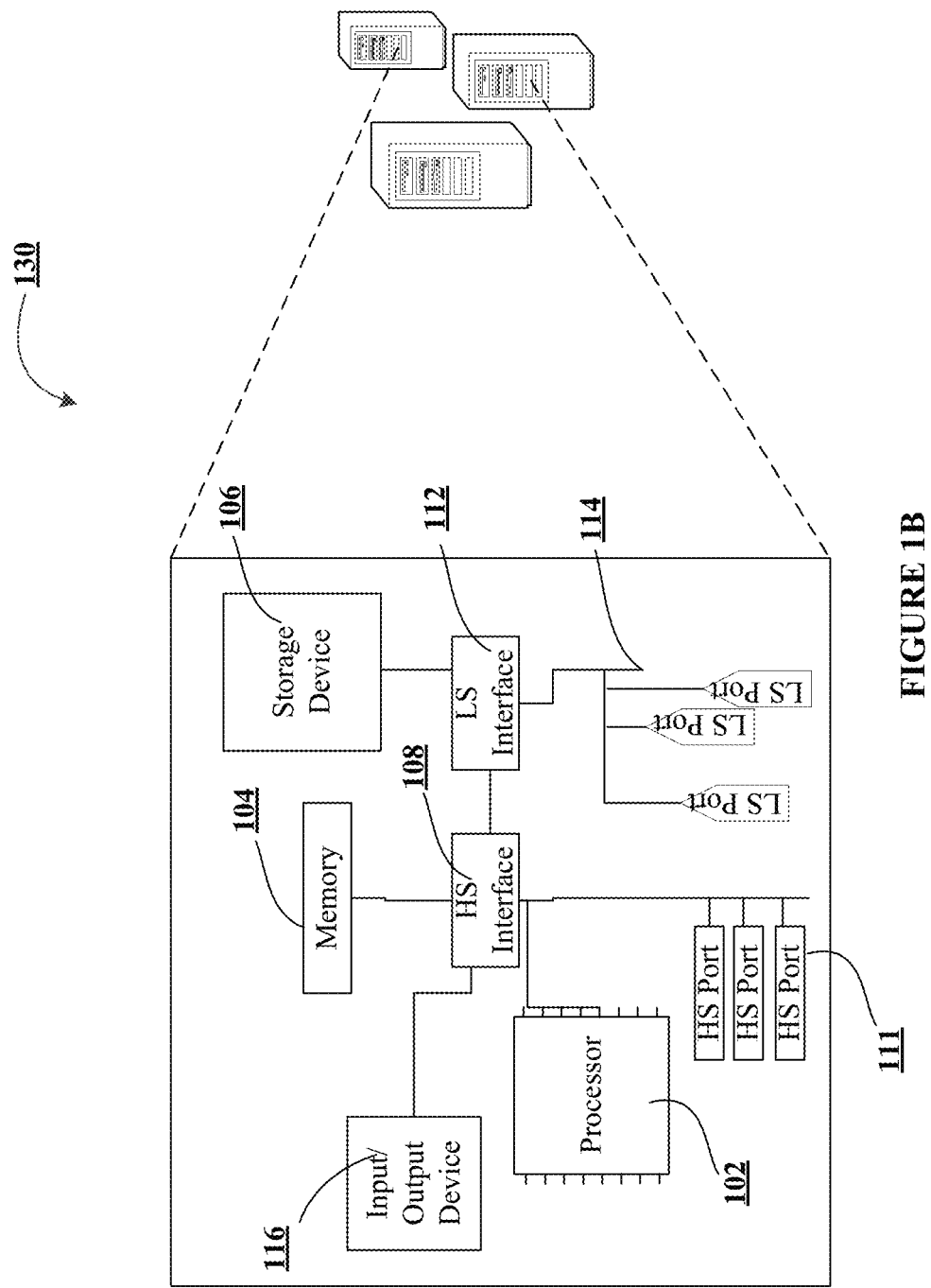
Figure 1C:
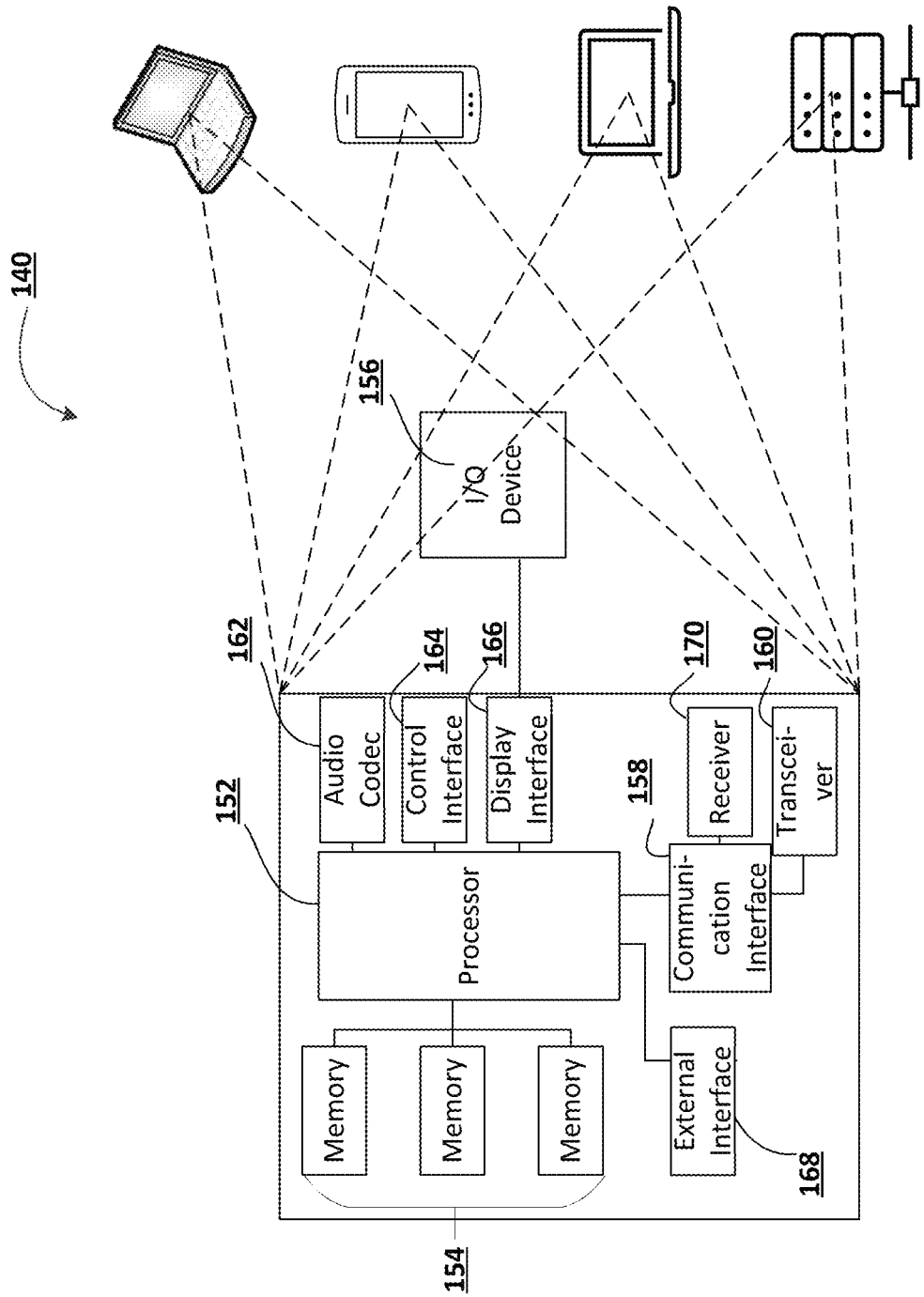
Figure 2:
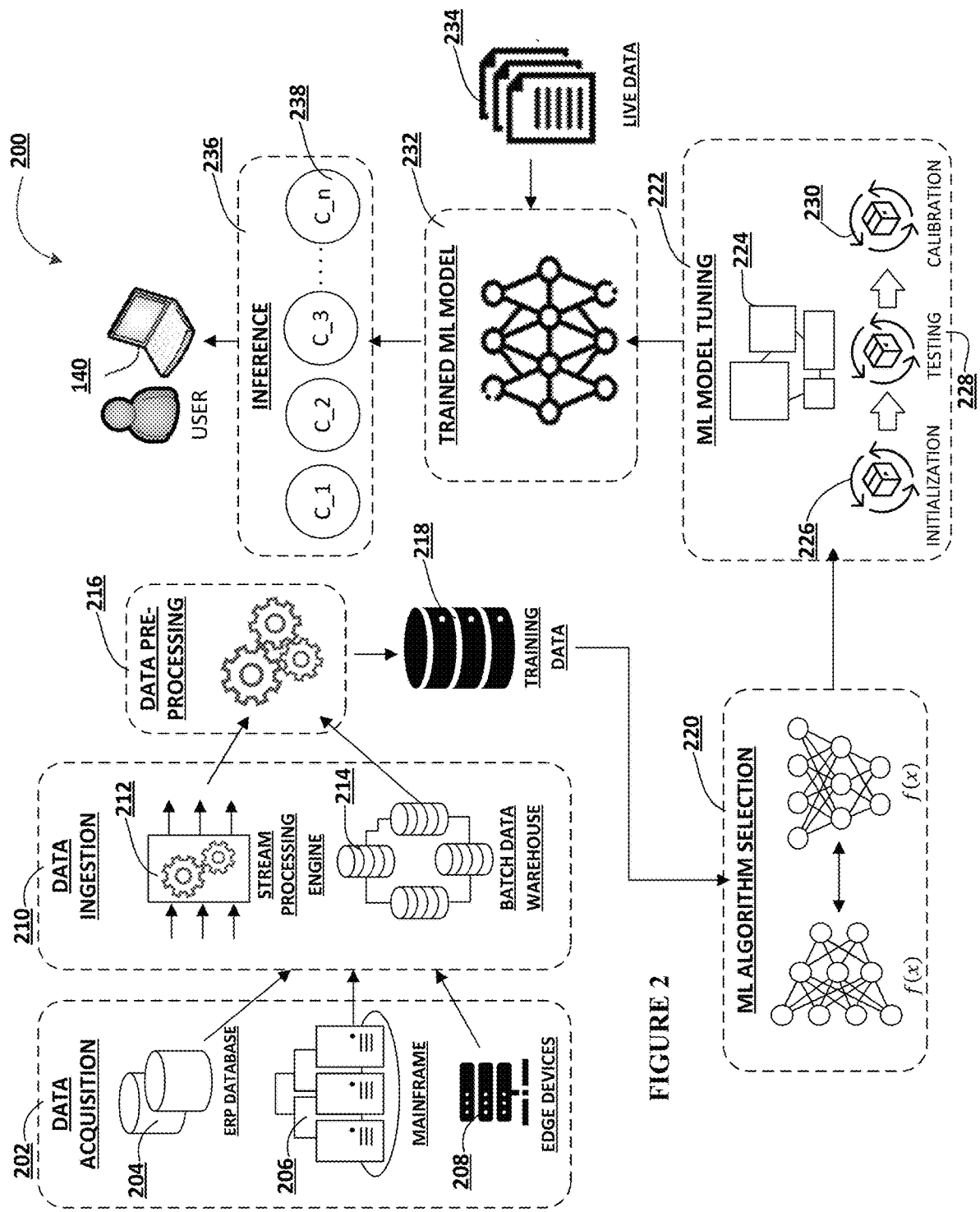
Figure 3:
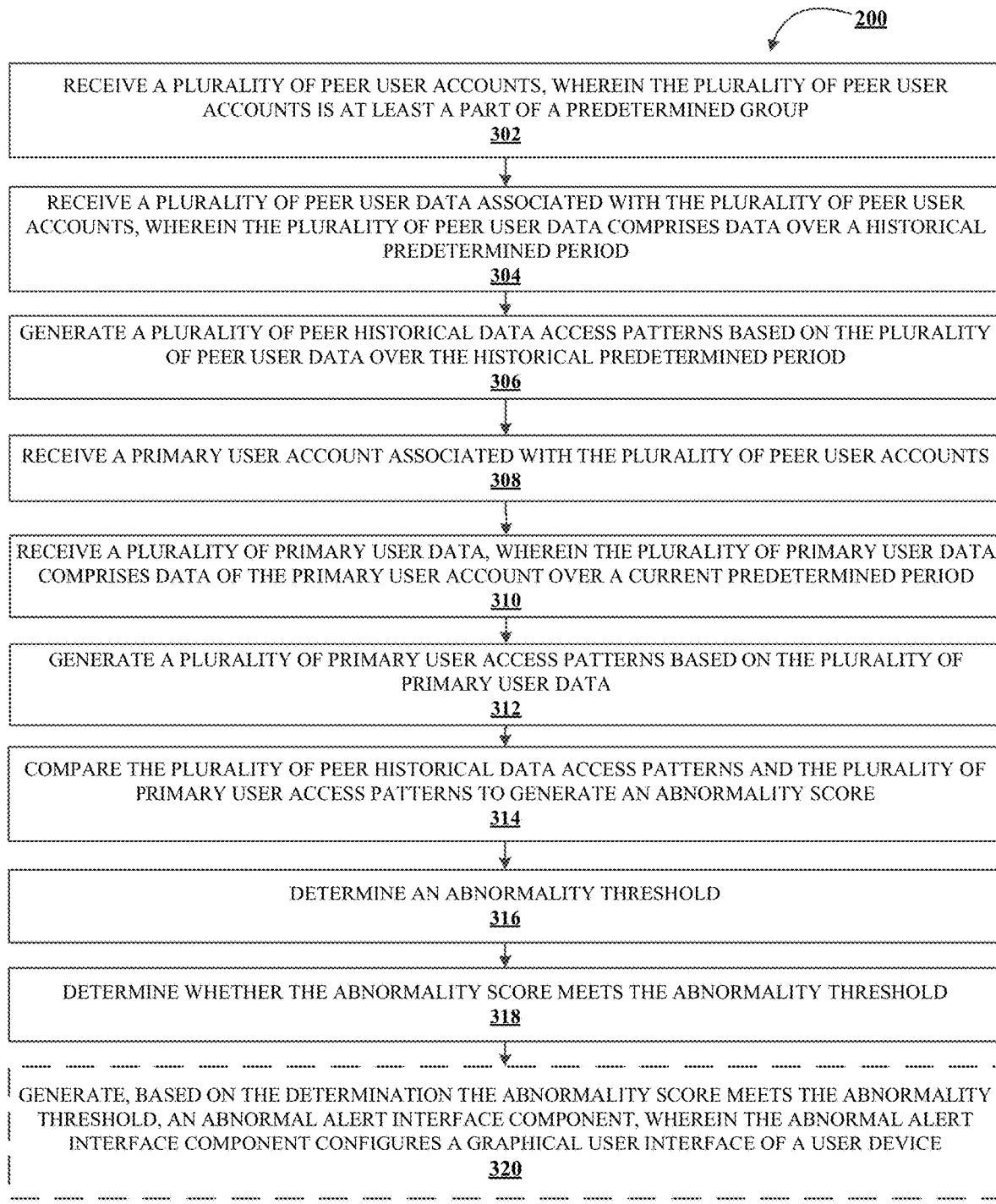
Figure 4:
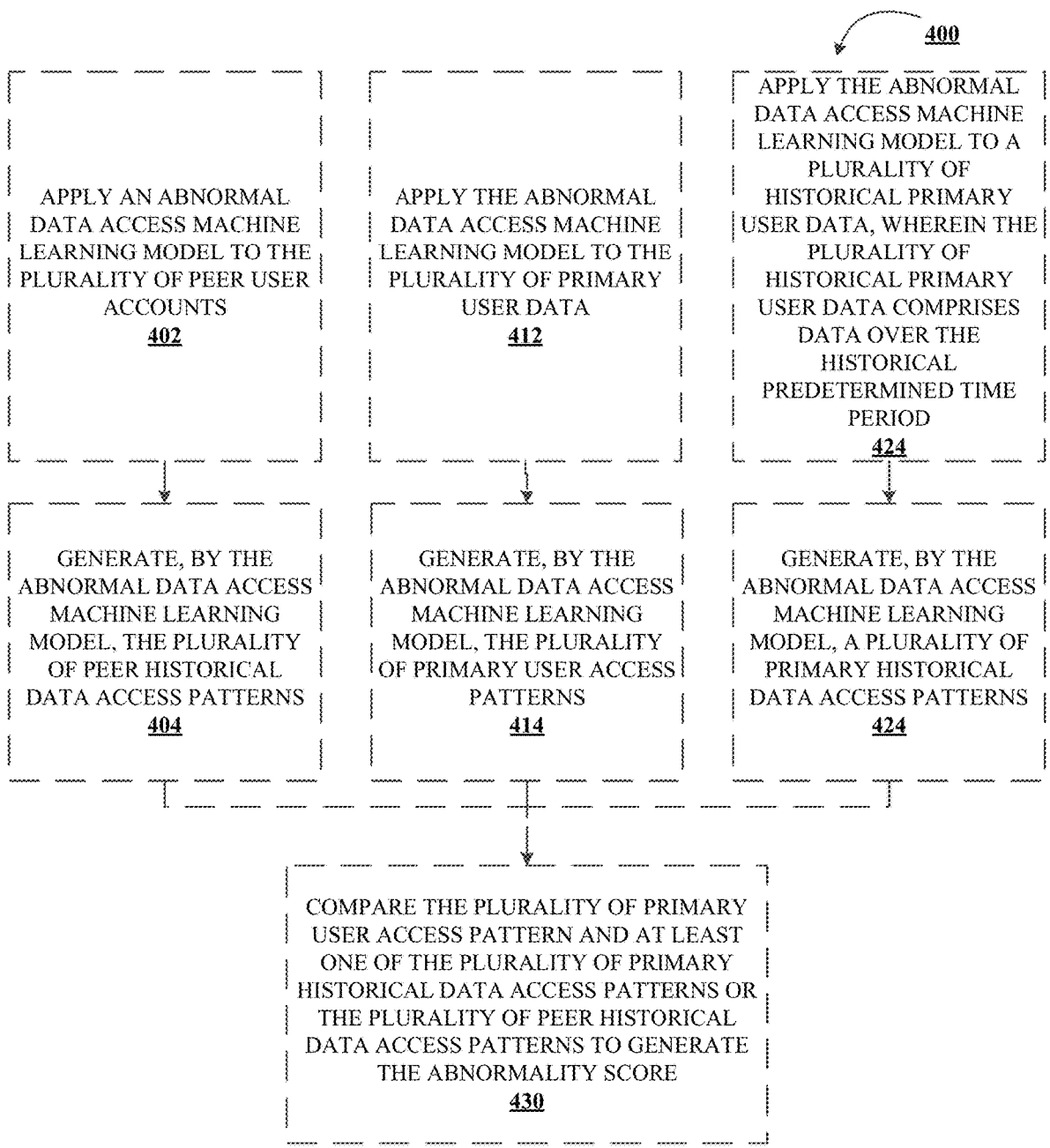
Figure 5:
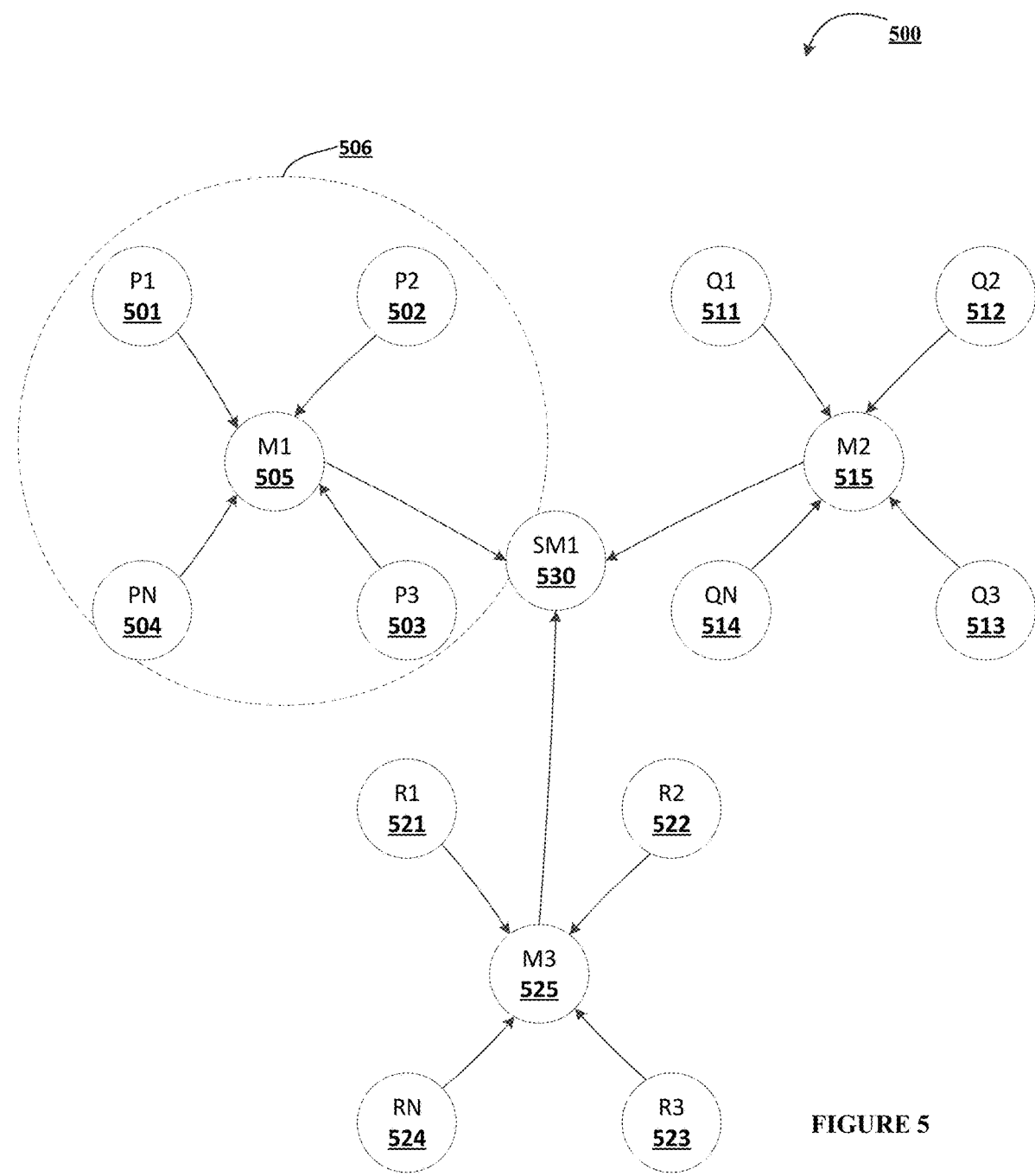
Figure 6:
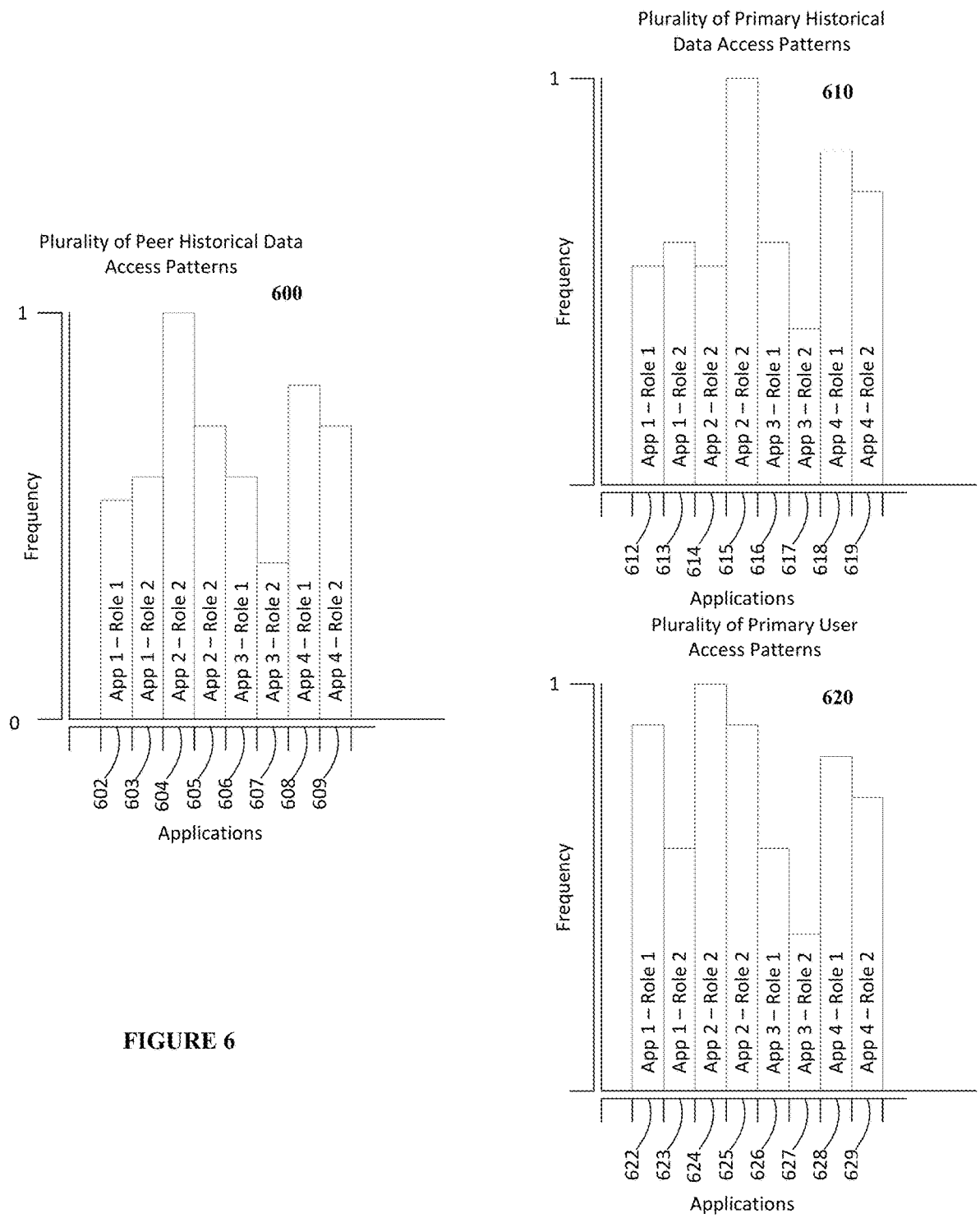

Having thus described embodiments of the invention in general terms, reference will now be made the accompanying drawings, wherein:

FIGS. 1A-1C illustrates technical components of an exemplary distributed computing environment for tracking network traffic data and identifying rogue access patterns in an electronic network, in accordance with an embodiment of the invention;

FIG. 2 illustrates technical components of an exemplary abnormal data access machine learning model, in accordance with an embodiment of the invention;

FIG. 3 illustrates a process flow for tracking network traffic data and identifying rogue access patterns in an electronic network, in accordance with an embodiment of the invention;

FIG. 4 illustrates a process flow for generating an abnormality score, in accordance with an embodiment of the invention;

FIG. 5 an exemplary relational mapping structure, in accordance with an embodiment of the invention; and FIG. 6 exemplary data access patterns, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described in further detail herein, the present invention provides a solution to the above-referenced problems in the field of technology by generating an accurate, efficient, and dynamic solution for tracking network traffic data and identifying rogue access patterns in an electronic network. The present invention solves this technical problem by implementing a rogue access tracking system, like that shown as system 130 in FIGS. 1A-1C. For instance, the rogue access tracking system acts to receive and assess a plurality of peer user accounts and their associated data accessing of various applications, websites, and/or the like over a predetermined period (e.g., a historical predetermined period) to generate a plurality of peer historical data access patterns. The rogue access tracking system may further receive and assess a plurality of primary user account data regarding the accessing of various applications, websites, and/or the like over a current time period (e.g., the most recent time period, such as the last day, week, month, and/or the like) which matches an amount of time to the historical predetermined period. The rogue access tracking system may use the primary user account data comprising the accessing of various applications, websites, and/or the like over the current predetermined period, to generate a plurality of primary user access patterns. Based on the comparison of at least the plurality of peer historical data access patterns and the plurality of primary user access patterns, the rogue access tracking system may determine an abnormality score of the primary user which may be used to determine if the primary user is acting in accordance with the peers in their predetermined group in accessing data on certain applications, websites, and/or the like. Such an abnormality score may be used by the rogue access tracking system to determine whether the data accessing by at least one user (e.g., a primary user) is abnormal, which could lead to insecure data usage, lowered performance of processing devices (e.g., the more applications in use that are not supposed to be in use for a user's computing device could lead to lowered processing speeds), and/or the like.

Thus, the rogue access tracking system provides a technical solution to the technical problem in accurately, efficiently, and dynamically implementing tracking rogue access patterns of user accounts within a predetermined group, whereby the rogue access patterns may be used by the rogue access tracking system to determine whether an electronic user is accessing websites or applications in accordance with their peer electronic users. Accordingly, the rogue access tracking system acts to receive a plurality of peer user accounts, receive a plurality of peer user data associated with the plurality of peer user accounts, and generate a relational mapping based at least on a predetermined group (e.g., a group within an organization or entity). The rogue access tracking system may further act to generate a plurality of peer historical data access patterns based on the plurality of peer user data over a historical predetermined period, receive a primary user account associated with a plurality of peer user accounts, and receive a plurality of primary user data (e.g., a plurality of primary user data over a current predetermined period). The rogue access tracking system may further act to generate a plurality of primary user access patterns based on the plurality of primary user data, compare the plurality of peer historical data access patterns and the plurality of primary user access patterns to generate an abnormality score, and determine whether the abnormality score meets an abnormality threshold.

What is more, the present invention provides a technical solution to a technical problem. As described herein, the technical problem includes the problem of accurately, efficiently, and dynamically tracking and determining whether an electronic user is accessing websites, applications, and/or the like in a rogue manner as compared to peer electronic users. The technical solution presented herein allows for accurately, efficiently, and dynamically implementing the tracking of rogue access patterns of user accounts within a predetermined group. In particular, the rogue access tracking system is an improvement over existing solutions to the tracking and determining of abnormal or rogue access patterns for electronic data accessing and usage problems identified herein, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution (e.g., by accurately and efficiently determining rogue access patterns across a plurality of users within a group), (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for tracking network traffic data and identifying rogue access patterns in an electronic network 100, in accordance with an embodiment of the invention. As shown in FIG. 1A, the distributed computing environment 100 contemplated herein may include a system 130 (i.e., a rogue access tracking system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O)

device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary abnormal data access machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for tracking network traffic data and identifying rogue access patterns in an electronic network, in accordance with an embodiment of the invention. In some embodiments, a system (e.g., similar to one or more of the systems described herein with respect to FIGS. 1A-1C and 2) may perform one or more of the steps of process flow 300. For example, a rogue access tracking system (e.g., the system 130 described herein with respect to FIGS. 1A-1C) may perform the steps of process flow 300.

As shown in block 302, the process flow 300 may include the step of receiving a plurality of peer user accounts, wherein the plurality of peer user accounts is at least a part of a predetermined group. In some embodiments, the rogue access tracking system may receive data regarding a plurality of peer user accounts, where the plurality of peer user accounts may each be associated with each other within an organization or group of people. By way of non-limiting example, the plurality of peer user accounts is a plurality of peers belonging to the same group within an organization or entity, such as a group of employees working in the same team, a group of employees and their manager(s) working in the same team or on the same project/task, and/or the like. In some embodiments, the predetermined group associated with the plurality of peer user accounts may be determined based on the team, project/task, and/or the like.

In some embodiments, the plurality of peer user accounts may be mapped into a relational mapping based on each predetermined group. For instance, the relational mapping may be generated to show the relationship between the plurality of peer user accounts, such as to show a plurality of peers each having the same manager (e.g., the plurality of employees within the same team, having the same project/task, and/or the like). The relational mapping is described in further detail below with respect to FIG. 5.

As shown in block 304, the process flow 300 may include the step of receiving a plurality of peer user data associated with the plurality of peer user accounts, wherein the plurality of peer user data comprises data over a historical predetermined period. By way of non-limiting example, the rogue access tracking system may receive—from a plurality of user devices associated with the plurality of peer user accounts—data regarding the accessing of websites, applications, and/or the like that the peer user accounts have accessed over a specified time period such as the historical predetermined period. In some embodiments, the rogue access tracking system may receive—from the plurality of user devices associated with the plurality of peer user accounts—data regarding the accessing of websites, applications, and/or the like and store the associated in a database (e.g., storage device 106 and/or memory 104) of the rogue access tracking system for later recall for generating a plurality of peer historical data access patterns for the plurality of peers.

In some embodiments, the historical predetermined period for which the plurality of peer user data is received and/or stored, may comprise a specified period of time such as a day, a week, a month, and/or the like. In some embodiments, the historical predetermined period is determined by the rogue access tracking system itself, by a manager of the rogue access tracking system, by a client of the rogue access tracking system (e.g., an organization using the rogue access tracking system to determine abnormalities of the data access patterns), and/or the like. By way of non-limiting example, the historical predetermined period occurs at a previous time to the current predetermined period (e.g., the day, the previous week, the previous month, and/or the like).

As shown in block 306, the process flow 300 may include the step of generating a plurality of peer historical data access patterns based on the plurality of peer user data over the historical predetermined period. By way of non-limiting example, the rogue access tracking system may generate, based on the plurality of peer user data over the historical predetermined period, a plurality of peer historical data access patterns to show the data access patterns of the entire group of peers within the predetermined group. For instance, the plurality of peer historical data access patterns may comprise data showing the amount of accessing done by the group of peers within the historical predetermined period. The plurality of peer historical data access patterns may be averaged to include the entirety of the data of all the peers within the predetermined group over the historical predetermined period and may further be shown as a frequency distribution of accessing, where the frequency distribution may be shown as a score between zero and one. In some embodiments, the plurality of peer historical data access patterns may further be split to show each application accessed by the predetermined group of peers, as well as the roles of each access (e.g., a user role, an admin role, and/or the like). An exemplary illustration of a plurality of peer historical data access patterns are shown in further detail in FIG. 6.

As shown in block 308, the process flow 300 may include the step of receiving a primary user account associated with the plurality of peer user accounts. In some embodiments, the rogue access tracking system may receive data regarding a primary user account that is associated with the plurality of peer user accounts from the predetermined group. For instance, the primary user account may be a selected user account (e.g., selected by the rogue access tracking system, selected by a manager of the rogue access tracking system, selected by manager associated with a client of the system, and/or the like), for which the primary user is the user that the rogue access tracking system should determine whether abnormal data access patterns have occurred, and where the primary user also belongs to the predetermined group with the plurality of peer user accounts.

As shown in block 310, the process flow 300 may include the step of receiving a plurality of primary user data, wherein the plurality of primary user data comprises data of the primary user account over a current predetermined period. In some embodiments, the rogue access tracking system may receive the plurality of primary user data associated with the primary user account from a user device associated with the primary user account. For instance, the primary user data may comprise data regarding the primary user account's access of websites, applications, and/or the like, and the roles in which the primary user accessed the websites, applications, and/or the like. In some embodiments, the rogue access tracking system may receive the primary user data from the user device associated with the primary user account and store the primary user data in association with the period for which the data was generated (e.g., a current predetermined period or a historical predetermined time period). For instance, the current predetermined period is the same amount of time (e.g., a day, a week, a month, and/or the like) as the historical predetermined period, but where the current predetermined period occurs at a later time than the historical predetermined period. The current predetermined period may thus be the current or immediately previous period of time for the collection of data (e.g., the immediate prior day, immediate prior week, immediate prior month, and/or the like), such that the current predetermined period is used to track the most recent set of data accessing.

As shown in block 312, the process flow 300 may include the step of generating a plurality of primary user access patterns based on the plurality of primary user data. By way of non-limiting example, the rogue access tracking system may generate the plurality of primary user access patterns based on the plurality of primary user data collected over the current predetermined period. By way of non-limiting example, and similar to the generation of the plurality of peer historical data access patterns, the rogue access tracking system may generate the plurality of primary user access patterns to show the accessing of websites, applications, and/or the like as a frequency distribution (e.g., a plurality of frequency distributions for the plurality of primary user access patterns) over the current predetermined period. Such a plurality of primary user access patterns is described in further detail below with respect to FIGS. 4 and 6.

As shown in block 314, the process flow 300 may include the step of comparing the plurality of peer historical data access patterns and the plurality of primary user access patterns to generate an abnormality score. In some embodiments, the rogue access tracking system may compare the plurality of peer historical data access patterns and the plurality of primary user access patterns to determine abnormal access patterns of the primary user account against the peer user accounts within the predetermined group or among other users within the same organization (e.g., a manager of the predetermined group and/or the like). By way of non-limiting example, the rogue access tracking system may generate an abnormality score to show the similarity (or the difference) between the primary user access patterns and at least the peer historical data access patterns. The comparison of the plurality of peer historical data access patterns and the plurality of primary user access patterns is described in further detail below with respect to FIGS. 4 and 6.

As shown in block 316, the process flow 300 may include the step of determining an abnormality threshold. In some embodiments, the rogue access tracking system may determine an abnormality threshold for the data access patterns (the primary user access patterns and the peer historical data access patterns) by requesting input from a manager of the rogue access tracking system, by a determination from the rogue access tracking system itself, by a manager of a client of the rogue access tracking system (e.g., the organization or entity for which the predetermined group belongs), and/or the like. Such an abnormality threshold may comprise a level, score, and/or amount for which—if met by an abnormality score generated by the rogue access tracking system—will be used to determine that the primary user account is not acting in accordance with the peer user accounts within the predetermined group. For instance, the rogue access tracking system—when determining that the primary user account is not acting in accordance with the peer user accounts—bases the determination on the data access pattern comparison (e.g., the primary user access pattern at a current predetermined period, the peer historical data access patterns, the historical primary user data—which is described in further detail below—and/or the like). In this manner, the rogue access tracking system determines that the primary user is accessing websites, applications, and/or the like at normal or abnormal rates as compared to the peer user accounts and such activity may be flagged or reported to a client of the rogue access tracking system associated with the predetermined group.

As shown in block 318, the process flow 300 may include the step of determining whether the abnormality score meets the abnormality threshold. In some embodiments, the rogue access tracking system may determine whether the abnormality score meets and/or exceeds the abnormality threshold. By way of non-limiting example, where the abnormality score meets or exceeds the abnormality threshold, the rogue access tracking system may determine that the primary user account is not acting in a similar manner with the peer user accounts within the same group (or within the overall same organization) and may determine that the primary user account should be flagged for further investigation.

In some embodiments, and as shown in block 320, the process flow 300 may include the step of generating, based on the determination the abnormality score meets the abnormality threshold, an abnormal alert interface component, where the abnormal alert interface component configures a graphical user interface of a user device. By way of non-limiting example, the rogue access tracking system may generate an abnormal alert interface component, which comprises computer-readable data to configure a graphical user interface of a user device to show the data regarding the primary user account and its primary user access patterns. For instance, such an abnormal alert interface component may be transmitted to a user device associated with a manager of the rogue access tracking system, a client associated with the rogue access tracking system (e.g., a manager of the predetermined group), and/or the like, to show whether the primary user account is accessing websites, applications, and/or the like in an abnormal pattern.

FIG. 4 illustrates a process flow 400 for generating an abnormality score, in accordance with an embodiment of the invention. In some embodiments, a system (e.g., similar to one or more of the systems described herein with respect to FIGS. 1A-1C and 2) may perform one or more of the steps of process flow 400. For example, a rogue access tracking system (e.g., the system 130 or machine learning model 232 described herein with respect to FIGS. 1A-1C and 2) may perform the steps of process flow 400.

In some embodiments, and as shown in block 402, the process flow 400 may include the step of applying an abnormal data access machine learning model to the plurality of peer user accounts. By way of non-limiting example, the rogue access tracking system may apply an abnormal data access machine learning model (e.g., machine learning model 232 of FIG. 2) to the plurality of peer user accounts and their associated plurality of peer user data to consolidate and generate the plurality of peer historical data access patterns for each application accessed by the plurality of peer user accounts. In some embodiments, the abnormal data access machine learning model may additionally generate the peer historical data access patterns to show at least one role for each access of the plurality of peer access accounts (e.g., user role, admin role, and/or the like). By way of non-limiting example, the abnormal data access machine learning model may be trained to generate the peer historical data access patterns as frequency distributions such that each peer historical data access pattern for each role and/or app is generated to be a score from zero to one. Such a frequency distribution may be used to show the averaged amount between the peer user accounts of the predetermined group across the historical predetermined period.

In some embodiments, and as shown in block 404, the process flow 400 may include the step of generating, by the abnormal data access machine learning model, the plurality of peer historical data access patterns. For instance, the rogue access tracking system may generate the plurality of peer historical data access patterns as a frequency distribution for each of the applications (and/or for each of the roles within the accessing of each application). In some embodiments, the plurality of peer historical data access patterns may be displayed as a graph (such as that shown in FIG. 6) for comparison by the rogue access tracking system.

In some embodiments, and as shown in block 412, the process flow 400 may include the step of applying the abnormal data access machine learning model to the plurality of primary user data. Similar to the generation of the plurality of peer historical data access patterns, the rogue access tracking system may apply the abnormal data access machine learning model to the plurality of primary user data to generate the plurality of primary user access patterns to consolidate and generate the plurality of primary user access patterns for each application accessed by the primary user account over a specified period (e.g., the current predetermined period). In some embodiments, the abnormal data access machine learning model may additionally generate the plurality of primary user access patterns to show at least one role for each access of the primary user account (e.g., user role, admin role, and/or the like). By way of non-limiting example, the abnormal data access machine learning model may be trained to generate the primary user access patterns as frequency distributions such that each primary user access pattern for each role and/or app is generated to be a score from zero to one.

In some embodiments, and as shown in block 414, the process flow 400 may include the step of generating, by the abnormal data access machine learning model, the plurality of primary user access patterns. By way of non-limiting example, the rogue access tracking system may generate the plurality of primary user access patterns to show the frequency of accessing each application (and roles for each access) by the primary user account over the current predetermined period.

In some embodiments, and as shown in block 424, the process flow 200 may include the step of applying the abnormal data access machine learning model to a plurality of historical primary user data, wherein the plurality of historical primary user data comprises data over the historical predetermined period. By way of non-limiting example, the rogue access tracking system may apply the abnormal data access machine learning model to a plurality of historical primary user data which may be collected as primary user data from a historical predetermined period (e.g., the same historical predetermined period as the historical predetermined period of the plurality of peer historical data access patterns). In some embodiments, and where a primary user is new to the predetermined group and has no historical data (e.g., data from the historical predetermined period when the peer is part of the predetermined group), the rogue access tracking system may not generate the plurality of primary historical data access patterns.

In some embodiments, the historical primary user data may be received from a user device associated with the primary user, where the historical primary user data is generated during the historical predetermined period. In some embodiments, the rogue access tracking system may receive the plurality of historical primary user data from the historical predetermined period and store the plurality of historical primary user data within a storage database (e.g., such as memory 104 and/or storage device 106). In some embodiments, and based on the plurality of historical primary user data, the rogue access tracking system may generate the plurality of primary historical data access patterns for the primary user account over the historical predetermined period.

In some embodiments, an abnormal data access machine learning model may generate the plurality of primary historical data access patterns by inputting the historical primary user data and consolidating the accessing of applications (and/or roles of each access) by the primary user account over the historical predetermined period. In some embodiments, the abnormal data access machine learning model may generate the plurality of primary historical data access patterns as a frequency distribution such that each data access pattern for each application (and/or role of each application) comprises a score from zero to one.

In some embodiments, and as shown in block 430, the process flow 400 may include the step of comparing the plurality of primary user access patterns and at least one of the plurality of primary historical data access patterns or at least one of the plurality of peer historical data access patterns to generate the abnormality score. By way of non-limiting example, the rogue access tracking system may compare the plurality of primary user access pattern from the current predetermined period to at least one of the plurality of primary historical data access patterns and/or the plurality of peer historical data access patterns, whereby the difference between the plurality of primary user access patterns and at least one of the plurality of primary historical data access patterns and/or the plurality of primary historical data access patterns is used to generate the abnormality score.

In some embodiments, the rogue access tracking system may compare each of the data access patterns for each application (and/or role within each applicated accessed) to generate a difference, which may then be consolidated and/or averaged to generate the abnormality score across the entirety of the plurality of historical data access patterns for each of the plurality of primary user access patterns, the primary historical data access patterns, and/or the plurality of peer historical data access patterns. Such an abnormality score may be used to determine an overall abnormality for the entire predetermined period (e.g., current predetermined period) for the primary user as compared to the historical predetermined period.

FIG. 5 illustrates an exemplary relational mapping structure, in accordance with an embodiment of the invention. In some embodiments, a system (e.g., similar to one or more of the systems described herein with respect to FIGS. 1A-1C and 2) may generate the one or more blocks of the relational mapping 500. For example, a rogue access tracking system (e.g., the system 130 described herein with respect to FIGS. 1A-1C) may perform the steps to generate relational mapping 500.

In some embodiments, the rogue access tracking system may generate a relational mapping structure, such as that shown as relational mapping 500, which may comprise a plurality of peers within a team, group, and/or the like (e.g., Peers P1 (501), P2 (502), P3 (503), . . . PN (504)), which may further be associated with a leader and/or manager (e.g., Manager M1 (505)), which—in some embodiments—may be associated with its own leader and/or manager (e.g., SMI (530)).

In some embodiments, and as shown in the exemplary relational mapping 500, the relational mapping may further comprise a complete rendition of each of the predetermined groups within a client of the rogue access tracking system (e.g., an organization or entity using the rogue access tracking system), such as that shown as the peer group comprising Q1 (511), Q2 (512), Q3 (513), . . . QN (514), which may be associated with manager M2 (515), whereby the manager may also be associated with the senior manager SMI (530); and/or peer group R1 (521), R2 (522), R3 (523), . . . RN (524), which may be associated with the manager M3 (525), whereby the manager may also be associated with the senior manager SMI (530).

In some embodiments, the relational mapping may be used by the rogue access tracking system to store and/or show the data of each user within the predetermined group, where the data may comprise the relationship between each user account, its associated access data (e.g., applications access and/or roles used for accessing), predetermined groups for each user account, and/or the like. In some embodiments, the primary user account may be chosen from one of the peer user accounts shown in the relational mapping structure (e.g., P1 for predetermined group comprised within group 506). In some embodiments, the manager account (e.g., M1) may be a part of the peer user accounts used for comparison against the primary user account.

In some embodiments, the relational mapping and its associated peer user accounts shown as blocks 501 (P1), 502 (P2), 503 (P3), . . . 504 (PN) may be shown as nodes within the relational mapping. In some embodiments, each node may further comprise the data associated with each user account such as the data regarding each application accessed and/or each role used for each accessing. In some embodiments, the relational mapping may comprise a plurality of edges to show the relationship between each user account and associated peers and/or managers (e.g., the arrows connecting each node of the peer group to each associated manager(s)). In some embodiments, and as the predetermined group changes (e.g., new peers are added or taken out), the rogue access tracking system may dynamically add additional nodes and edges to indicate each user account and its associated data.

FIG. 6 illustrates exemplary data access patterns for each of the plurality of peer historical data access patterns 600, plurality of primary historical data access patterns 610, and primary user access patterns 620, in accordance with an embodiment of the invention. In some embodiments, a system (e.g., similar to one or more of the systems described herein with respect to FIGS. 1A-1C and 2) may generate the one or more graphs of the data access patterns 600, 610, and 620. For example, a rogue access tracking system (e.g., the system 130 described herein with respect to FIGS. 1A-1C) may perform the steps to generate the one or more graphs of the data access patterns 600, 610, and 620.

In some embodiments, the rogue access tracking system may generate a plurality of historical access data patterns displayed as graphs, such as that shown as the plurality of peer historical data access patterns 600, plurality of primary historical data access patterns 610, and plurality of primary user access patterns 620. For instance, and as shown in graph 600, the plurality of historical data access patterns may be shown as a bar graph (e.g., graph 600) which comprises frequency distribution data for each of the applications accessed by the plurality of peer user accounts, and in some embodiments the roles of each application accessing. For example, the access data of application 1 by the peer user accounts may be shown as bars 602 and 603, where bar 602 indicates the frequency distribution of the peer user accounts using a role 1 (e.g., a user role) and where bar 603 indicates the frequency distribution of the peer user accounts using role 2 (e.g., admin role). Likewise, graph 600 shows the frequency distributions of a plurality of applications and their roles (e.g., bar 604 and 605 showing application 2, bars 606 and 607 showing application 3, and bars 608 and 609 showing application 4). Each application and its associated roles of access may be indicated by a frequency distribution from zero to one to indicate how often, during the historic predetermined period the plurality of peer user accounts accessed the applications.

Similarly, and as shown in graph 610, the plurality of primary historical data access patterns may be shown as a bar graph (e.g., graph 610) which comprises frequency distribution data for each of the applications accessed by the primary user account, and in some embodiments the roles of each application accessing. In some embodiments, the bars of graph 610 may similarly be split up between applications accessed and roles of accessing. For example, the access data of application 1 by the primary user account over the historical predetermined period may be shown as bars 612 and 613, where bar 612 indicates the frequency distribution of the primary user account using a role 1 (e.g., a user role) and where bar 613 indicates the frequency distribution of the primary user account using role 2 (e.g., admin role). Likewise, graph 600 shows the frequency distributions of a plurality of applications and their roles (e.g., bar 604 and 605 showing application 2, bars 606 and 607 showing application 3, and bars 608 and 609 showing application 4).

The plurality of primary user access patterns graph (i.e., graph 620) may likewise indicate the primary user account's access patterns over a current predetermined period as frequency distributions and may be generated and used in a similar manner to the generation and use of graphs 600 and 610. However, graph 620 may be used as a comparison between at least one of graph 600 and/or graph 610 to determine the abnormality score. For instance, graph 620 may indicate that the primary user accessed the application 1 (bar 622) at a higher rate as role 1 than both the peer historical data access patterns and the primary historical data access patterns of the historical predetermined period. In some embodiments, and based on the graphs 600, 610, and 610, the rogue access tracking system may generate the abnormality score for each application and each role within each application including application 1 role 1. In this manner, the rogue access tracking system may determine if the abnormality score of application 1, role 1 abnormality threshold of the rogue access tracking system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for tracking network traffic data and identifying rogue access patterns, the system comprising:
   a memory device with computer-readable program code stored thereon;
      at least one processing device operatively coupled to the at least one memory device and the at least one communication device, wherein executing the computer-readable code is configured to cause the at least one processing device to:
   receive a plurality of peer user accounts, wherein the plurality of peer user accounts is at least a part of a predetermined group, and wherein the predetermined group is part of a plurality of predetermined groups within an entity;
   receive a plurality of peer user data associated with the plurality of peer user accounts, wherein the plurality of peer user data comprises data over a historical predetermined period;
   generate a relational mapping based at least on the predetermined group, wherein the relational mapping comprises nodes and edges indicating the connections between the plurality of peer user accounts based on the plurality of peer user data;
generate a plurality of peer historical data access patterns based on the plurality of peer user data over the historical predetermined period;
receive a primary user account associated with the plurality of peer user accounts;
receive a plurality of primary user data, wherein the plurality of primary user data comprises data of the primary user account over a current predetermined period;
generate a plurality of primary user access patterns based on the plurality of primary user data;
compare the plurality of peer historical data access patterns and the plurality of primary user access patterns to generate an abnormality score;
determine an abnormality threshold; and
determine whether the abnormality score meets the abnormality threshold.

2. The system of claim 1, wherein the plurality of peer historical data access patterns comprises data regarding at least one application accessed by the plurality of peer user accounts and a shared access role for the at least one application.

3. The system of claim 1, wherein the processing device is further configured to:
apply an abnormal data access machine learning model to the plurality of peer user accounts; and
generate, by the abnormal data access machine learning model, the plurality of peer historical data access patterns.

4. The system of claim 3, wherein the processing device is further configured to:
apply the abnormal data access machine learning model to the plurality of primary user data; and
generate, by the abnormal data access machine learning model, the plurality of primary user access patterns.

5. The system of claim 3, wherein the processing device is further configured to:
apply the abnormal data access machine learning model to a plurality of historical primary user data, wherein the plurality of historical primary user data comprises data over the historical predetermined time period; and
generate, by the abnormal data access machine learning model, a plurality of primary historical data access patterns.

6. The system of claim 5, wherein the processing device is further configured to compare the plurality of primary user access patterns and at least one of the plurality of primary historical data access patterns or the plurality of peer historical data access patterns to generate the abnormality score.

7. The system of claim 1, wherein the processing device is further configured to generate, based on the determination the abnormality score meets the abnormality threshold, an abnormal alert interface component, wherein the abnormal alert interface component configures a graphical user interface of a user device.

8. The system of claim 1, wherein the relational mapping comprises a plurality of nodes associated with each user of the predetermined group, and wherein the predetermined group further comprises the primary user account.

9. The system of claim 8, wherein the relational mapping comprises at least one edge, wherein the at least one edge is associated with each node of the plurality of nodes.

10. The system of claim 1, wherein at least a plurality of primary user access patterns and at least one of a plurality of primary historical data access patterns or the plurality of peer historical data access patterns comprise a frequency distribution.

11. The system of claim 1, wherein the historical predetermined time period and the current predetermined time period comprise a same amount of time.

12. The system of claim 11, wherein the historical predetermined time period is prior to the current predetermined time period.

13. A computer program product for tracking network traffic data and identifying rogue access patterns, wherein the computer program product comprises at least one non-transitory computer-readable medium having computer-readable program code portions embodied therein, the computer-readable program code portions which when executed by a processing device are configured to cause the processor to:
receive a plurality of peer user accounts, wherein the plurality of peer user accounts is at least a part of a predetermined group, and wherein the predetermined group is part of a plurality of predetermined groups within an entity;
receive a plurality of peer user data associated with the plurality of peer user accounts, wherein the plurality of peer user data comprises data over a historical predetermined period;
generate a relational mapping based at least on the predetermined group, wherein the relational mapping comprises nodes and edges indicating the connections between the plurality of peer user accounts based on the plurality of peer user data;
generate a plurality of peer historical data access patterns based on the plurality of peer user data over the historical predetermined period;
receive a primary user account associated with the plurality of peer user accounts;
receive a plurality of primary user data, wherein the plurality of primary user data comprises data of the primary user account over a current predetermined period;
generate a plurality of primary user access patterns based on the plurality of primary user data;
compare the plurality of peer historical data access patterns and the plurality of primary user access patterns to generate an abnormality score;
determine an abnormality threshold; and
determine whether the abnormality score meets the abnormality threshold.

14. The computer program product of claim 13, wherein the plurality of peer historical data access patterns comprises data regarding at least one application accessed by the plurality of peer user accounts and a shared access role for the at least one application.

15. The computer program product of claim 13, wherein the relational mapping comprises a plurality of nodes associated with each user of the predetermined group, and wherein the predetermined group further comprises the primary user account.

16. The computer program product of claim 13, wherein at least plurality of primary user access patterns and at least one of a plurality of primary historical data access patterns or the plurality of peer historical data access patterns comprise a frequency distribution.

17. A computer-implemented method for tracking network traffic data and identifying rogue access patterns, the computer-implemented method comprising:

receiving a plurality of peer user accounts, wherein the plurality of peer user accounts is at least a part of a predetermined group, and wherein the predetermined group is part of a plurality of predetermined groups within an entity;

receiving a plurality of peer user data associated with the plurality of peer user accounts, wherein the plurality of peer user data comprises data over a historical predetermined period;

generating a relational mapping based at least on the predetermined group, wherein the relational mapping comprises nodes and edges indicating the connections between the plurality of peer user accounts based on the plurality of peer user data;

generating a plurality of peer historical data access patterns based on the plurality of peer user data over the historical predetermined period;

receiving a primary user account associated with the plurality of peer user accounts;

receiving a plurality of primary user data, wherein the plurality of primary user data comprises data of the primary user account over a current predetermined period;

generating a plurality of primary user access patterns based on the plurality of primary user data;

comparing the plurality of peer historical data access patterns and the plurality of primary user access patterns to generate an abnormality score;

determining an abnormality threshold; and determining whether the abnormality score meets the abnormality threshold.

18. The computer-implemented method of claim 17, wherein the plurality of peer historical data access patterns comprises data regarding at least one application accessed by the plurality of peer user accounts and a shared access role for the at least one application.

19. The computer-implemented method of claim 17, wherein the relational mapping comprises a plurality of nodes associated with each user of the predetermined group, and wherein the predetermined group further comprises the primary user account.

20. The computer-implemented method of claim 17, wherein at least the plurality of primary user access patterns and at least one of a plurality of primary historical data access patterns or the plurality of peer historical data access patterns comprise a frequency distribution.

* * * * *